March 17, 1970  V. S. MOSINSKIS  3,501,250
ROTOR HUB
Filed March 22, 1968

INVENTOR:
VICTOR S. MOSINSKIS,
BY *Albertus Hilburger*
ATTORNEY

United States Patent Office 3,501,250
Patented Mar. 17, 1970

3,501,250
ROTOR HUB
Victor S. Mosinskis, Springfield, Pa., assignor to The Boeing Company, Seattle, Wash., a corporation of Delaware
Filed Mar. 22, 1968, Ser. No. 715,325
Int. Cl. B63k 1/06, 5/12
U.S. Cl. 416—140
9 Claims

ABSTRACT OF THE DISCLOSURE

A rotor hub assembly for a vertical lift aircraft in which a universal bearing having a fixed center supports a rotor blade on a rotatable hub for pivotal movement about lag and flapping axes and for rotational movement about a pitch axis, all of which axes intersect at the fixed center. A resilient bearing restrains the blade against centrifugal forces and cooperates with the universal bearing to permit movement of the blade about the lag, flapping, and pitch axes.

---

This invention relates generally to rotor hubs for uhe with vertical lift aircraft and particularly to rotor hubs of the articulated variety.

Conventional articulated rotor hubs have generally been of a complex construction employing many elements in the load path extending from the rotor shaft to the rotor blade. These hubs generally employed three separate hinges for each blade so as to permit the blade to rotate about a pitch axis, and to pivot about lag and flapping axes. It was usually necessary to provide each hinge with precision rolling element bearings, a source of lubrication, and suitable seals. The resulting structure was heavy, costly to produce, and expensive to maintain. Further, normal procedures usually required substantially clean facilities for assembly, inspection, and over-haul. This requirement made field maintenance difficult, particularly in view of the fact that each hinge with its large number of component parts was susceptible to the effects of adverse environments.

To improve the characteristics of articulated rotor hubs, various constructions for retention of rotor blades have been proposed which employ resilient bearings including a plurality of concentric spherical plates and elastomer bonded together in alternate layers. In these instances, a resilient bearing is so constructed that the centrifugal force of the blade, upon rotation of the hub, results in compression of the elastomer within the bearing while the resilient nature of the bearing further permits pitch, lag, and flapping motions of the blade. The layers of elastomer are sufficiently thin to withstand high normal pressures, without bulging outwardly, that is, in directions normal to forces applied to the bearing, and the ability of each layer to deflect in shear in order to accommodate blade motions about the pitch, lag, and flapping axes, is substantially independent of the normal pressures applied to the bearing. In this manner, the resilient bearing is able to provide the required blade motion while restraining the centrifugal loads resulting from rotation of the hub.

Although such resilient retention bearings are highly desirable due to their simplicity and reduced weight and cost over conventional bearings, it has been found that this very feature of resiliency often results in imbalance within the rotating rotor hub which in turn gives rise to undesirable vibrations. Specifically, with the known constructions, it has been difficult to "track" the different blades of a multiple-blade rotor system, that is, to assure that the tips of each of the blades would proceed along a uniform path. The present invention proposes a hub construction which retains all of the inherent desirable features of the resilient retention bearing construction while avoiding the difficulties described.

To this end, the invention is directed to a rotor hub assembly employing a universal bearing for supporting a rotor blade. The universal bearing has a fixed center and permits rotational movement of the blade about a pitch axis and pivotal movement of the blade about lag and flapping axes, all of which intersect at the fixed center. In addition, the universal bearing permits longitudinal motion of the blade and thus is not loaded by centrifugal force. A resilient bearing, including a plurality of concentric spherical plates and elastomer bonded together in alternate layers so as to be generally concentric with the universal bearing, restrains the blade against centrifugal force and cooperates with the universal bearing to permit rotation of the blade about the lag, flapping and pitch axes.

Enabling the blade to move freely about the pitch and lag axes when assuming full flap or full droop conditions, a roller is mounted on the blade coaxial with the pitch axis and engageable, respectively with a flap stop and with a droop stop integral with the hub. Also, a lag damper extends between the hub and a universal joint on the blade coaxial with the pitch axis so as to be fully effective to dampen blade movement about the lag axis, but substantially ineffective to dampen blade movement about either the pitch or flapping axes.

Accordingly, a primary object of the invention is to provide a new and improved rotor hub for a vertical lift aircraft.

Another object of the invention is the provision of a new and improved articulated rotor hub.

A further object of the invention is the provision of a new and improved blade retention arrangement for an articulated rotor hub.

Still another object of the invention is to provide a new and improved articulated rotor hub assembly employing a universal bearing having a fixed center supporting the blade for movement about lag, pitch, and flapping axes intersecting at the fixed center and a resilient bearing restraining the blade against centrifugal forces imposed in response to rotation of the hub. A related object is the provision of such an assembly in which the resilient bearing includes a plurality of concentric spherical plates and elastomer bonded together in alternate layers so as to be generally concentric with the fixed center. Another related object is to provide such a rotor hub including a roller on the blade concentric with the pitch axis and engageable with a droop stop and with a flap stop on the hub to thereby define lower and upper limits of movement of the blade about the flapping axis. Yet another related object is to provide such a rotor hub including a universal joint fixed to the blade substantially coaxial with the pitch axis and a damper mechanism extending between the hub and the universal joint whereby the damper is effective to dampen movement of the blade about the lag axis but is substantially ineffective to dampen movement of the blade about the pitch and flapping axes.

Other and further objects and advantages of the invention are obvious or will be disclosed in the description which follows, taken together with the accompanying drawings.

In the drawings, in which like reference numerals refer to like parts throughout:

Figure 1:
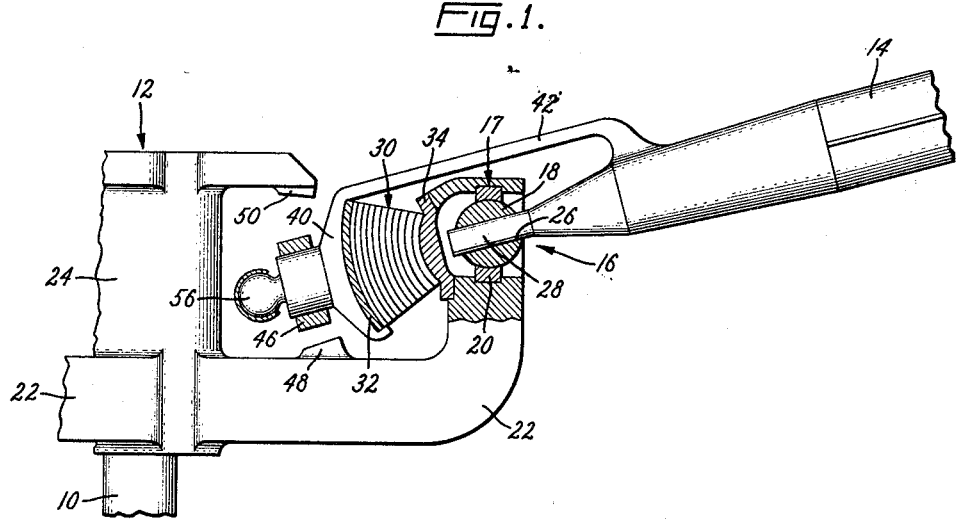
FIGURE 1 is a side elevation view, partly in section, of a rotor hub embodying the invention.
Figure 2:
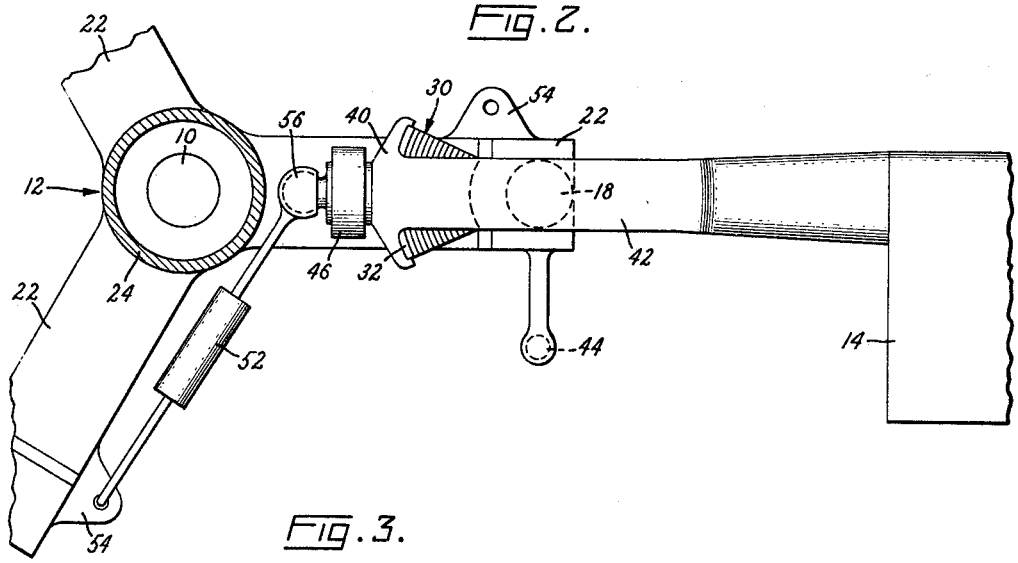
FIGURE 2 is a top plan view of the rotor hub illustrated in FIGURE 1, certain parts broken away and in section for greater clarity.

Refer now to the drawings and initially to FIGURES 1 and 2 which illustrate a rotor hub assembly in which a drive shaft 10 is adapted, upon rotation, to rotate a hub member 12. A plurality of blades 14 are attached to the hub 12 by means of a retention mechanism 16 whereby rotation of the drive shaft 10 and the hub member 12 is imparted to the blades 14.

The retention mechanism 16 includes a universal bearing 17 in the form of a ball 18 rotatably mounted in a socket 20 fixed to a support member 22 spaced substantially radially outward from a central portion 24 of the hub member 12. The socket 20 is preferably provided with a suitable bearing surface for firmly engaging the ball 18 while permitting free rotation of the ball about a fixed center. Provided with a diametrically extending bore 26, the ball 18 is adapted to receive a supporting shear shaft 28 integral with the blade 14 adjacent its inboard end. The shear shaft 28 is slideable within the ball 18 along a pitch axis of the blade 14 and is pivotable about lag and flapping axes which intersect at the center of the ball.

Figure 3:
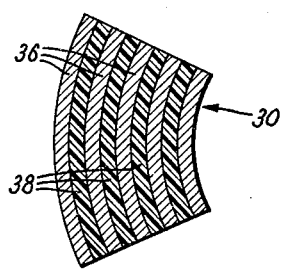
FIGURE 3 is a detail view of parts shown in FIGURES 1 and 2.

The retention mechanism 16 also includes a resilient bearing 30 having a center substantially concentric with the center of the ball 18. Interposed between inboard and outboard support elements 32 and 34, respectively, the resilient bearing 30 (see especially FIGURE 3) is composed of a plurality of concentric spherical plates 36 and elastomer 38 bonded together in alternate layers. The outboard element 34 is integral with the support member 22 and the inboard element 32 is fixed to an extension 40 of a housing 42 integral with the blade 14.

It is apparent, especially in FIGURE 1, that the resilient bearing 30 is so mounted that the centrifugal force exerted by the blade 14 in response to rotation of the hub member 12 results in compression of the elastomer 38. The layers of the elastomer 38 are sufficiently thin as to enable the resilient bearing 30 to withstand high normal pressures without bulging outwardly, that is, deflecting outwardly or in directions transverse to the centrifugal force. Further, as the blade 14 pivots about its flapping and lag axes or as a suitable pitch link 44 (FIGURE 2) is operated to rotate the blade about its pitch axis, the alternate plates 36 and elastomer 38 deflect in shear in a manner which is substantially independent of the compressive forces. Thus, the retention mechanism 16 provides for required blade motions while restraining the high centrifugal loads imparted by the blade. Specifically, the resilient bearing assumes all axial loads and the universal bearing carries all loads transverse to the pitch axis. As an additional feature, it can be seen that should the resilient bearing 30 fail, the interlocking arrangement of the support member 22 and the extension 40 provides a substantially fail-safe construction preventing the blade 14 from flying off in a radial direction.

To prevent binding between the blade 14 and the hub member 12 when the blade is in maximum elevated or depressed positions, a roller 46 is suitably mounted on the extension 40 coaxial with the pitch axis of the blade 14. When the blade 14 assumes its maximum elevated position, the roller 46 engages a flap stop 48 integral with the hub member 12 and when the blade 14 assumes a maximum depressed position, the roller 46 engages a droop stop 50 integral with the hub member 12. The flap stop 48 and the droop stop 50 are preferably conical in shape in order to accommodate pivoting of the blade 14 about its lag axis when the roller 46 is engaged with either the flap stop 48 or the droop stop 50.

To dampen motion of the blade 14 about its lag axis, a suitable damper 52 extends between a lug 54 integral with the support member 22 for an adjacent blade 14 and a suitable universal joint 56 mounted on the extension 40 substantially concentric with the pitch axis of the blade 14. In this manner, the damper 52 is effective to dampen movement of the blade 14 about its lag axis, and is substantially unaffected by movements of the blade 14 about its pitch and flapping axes.

An additional feature of the novel hub construction just disclosed resides in the smaller effective flapping mass present as compared with conventional constructions. That is, a considerable proportion of the mass, including the resilient bearing 30, the inboard support element 32, the extension 40, the roller 46, the damper 52 and the universal joint 56, is positioned inboard of the universal bearing 17 and partially balances the blade 14 and its associated structure about the ball 18. Specifically, the mass of those elements located inboard of the ball 18 provide a counter-clockwise moment (FIGURE 1), which partially offsets clockwise moments of the blade 14 about the ball 18 and aids substantially in reducing the vertical shaking forces and thus the level of vibration.

What is claimed is:

1. A rotor hub assembly for a vertical lift aircraft comprising a rotatable hub member, a rotor blade adapted to provide lift to said aircraft upon rotation of said hub member, retention means mounting said blade on said hub member and including a universal bearing having a fixed center supporting said blade for pivotal movement about a lag axis and about a flapping axis and for rotation about a pitch axis, said axes intersecting at said fixed center, and a resilient bearing restraining said blade against centrifugal forces imposed in response to rotation of said hub member and cooperating with said universal bearing to permit pivotal and rotational movement of said blade about said fixed center.

2. A rotor hub assembly as set forth in claim 1 wherein said universal bearing includes a socket fixed to said hub member and a ball rotatably mounted in said socket and said blade includes a supporting shaft rotatable with said ball and longitudinally movable relative to said ball.

3. A rotor hub assembly as set forth in claim 2 wherein said resilient bearing includes a plurality of spherical plates and elastomer bonded together in alternate layers so as to be generally concentric with said fixed center.

4. A rotor hub assembly as set forth in claim 3 wherein said hub member includes a droop stop and a flap stop and said blade includes a roller engageable with said droop stop to define a lower limit of movement of said blade about said flapping axis and engageable with said flap stop to define an upper limit of movement of said blade about said flapping axis.

5. A rotor hub assembly as set forth in claim 4 wherein said blade includes a universal joint fixed to said blade substantially coaxial with said pitch axis and including damper means extending between said hub member and said joint and adapted to dampen movement of said blade about said lag axis but substantially ineffective to dampen movement of said blade about said pitch and flapping axes.

6. A rotor hub assembly as set forth in claim 1 wherein said hub member includes a central portion and a support member spaced outwardly from said central portion, said universal bearing includes a socket fixed to said support member and a ball rotatably mounted in said socket, said blade includes an integral supporting shaft engageable with said ball and longitudinally movable relative thereto and a housing intermediate said central portion and said support member, and said resilient bearing is mounted between said housing and said support member.

7. A rotor hub assembly as set forth in claim 6 wherein said resilient bearing includes a plurality of concentric spherical plates and elastomer bonded together in alternate layers so as to be generally concentric with said fixed center.

8. A rotor hub assembly as set forth in claim 7 wherein said central portion includes a droop stop and a flap stop and said blade includes a roller adjacent said housing and engageable with said droop stop to define a lower limit of movement of said blade about said flapping axis and engageable with said flap stop to define an upper limit of movement of said blade about said flapping axis.

9. A rotor hub assembly as set forth in claim 8 wherein said blade includes a universal joint fixed to said housing substantially coaxial with said pitch axis and including damper means extending between said hub member and said joint and adapted to dampen movement of said blade about said lag axis but substantially ineffective to dampen movement of said blade about said pitch and flapping axes.

References Cited

UNITED STATES PATENTS

| 3,106,965 | 10/1963 | Gorndt et al. | 170—160.53 |
| 3,282,350 | 11/1966 | Kisovec | 170—160.53 XR |
| 3,292,712 | 12/1966 | Schmidt | 170—160.53 |
| 3,310,119 | 3/1967 | Watson | 170—160.53 |
| 2,261,337 | 11/1941 | Campbell | 170—160.55 XR |
| 2,557,338 | 6/1951 | Caldwell | 170—160.55 XR |
| 2,815,821 | 12/1957 | Echeverria | 170—160.55 |

EVERETT A. POWELL, Jr., Primary Examiner

U.S. Cl. X.R.

416—141